W. J. Walker.
Separating High & Low Wines.

N° 59,688. Patented Nov. 13. 1866.

Witnesses:
John S. Hollingshead
John D. Bloor

Inventor:
W. J. Walker

UNITED STATES PATENT OFFICE.

W. J. WALKER, OF BALTIMORE, MARYLAND.

IMPROVED APPARATUS TO BE ATTACHED TO STILLS TO PREVENT FRAUD ON THE REVENUE.

Specification forming part of Letters Patent No. 59,688, dated November 13, 1866.

*To all whom it may concern:*

Be it known that I, WILLIAM J. WALKER, of Baltimore, in the county of Baltimore, in the State of Maryland, have invented a new and Improved Mode of Separating High and Low Wines or other fermented liquors, and of testing their proof; and I do hereby declare that the following is a full and exact description thereof, reference being had to the accompanying drawings, and to the letters of reference marked thereon, in which—

Figure 1:
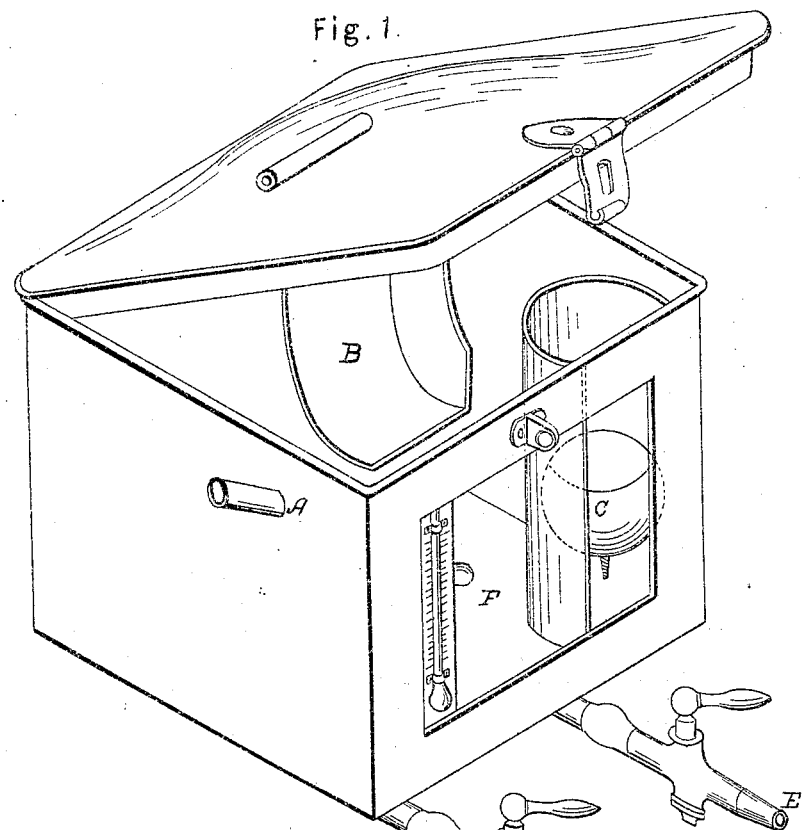
Figure 2:
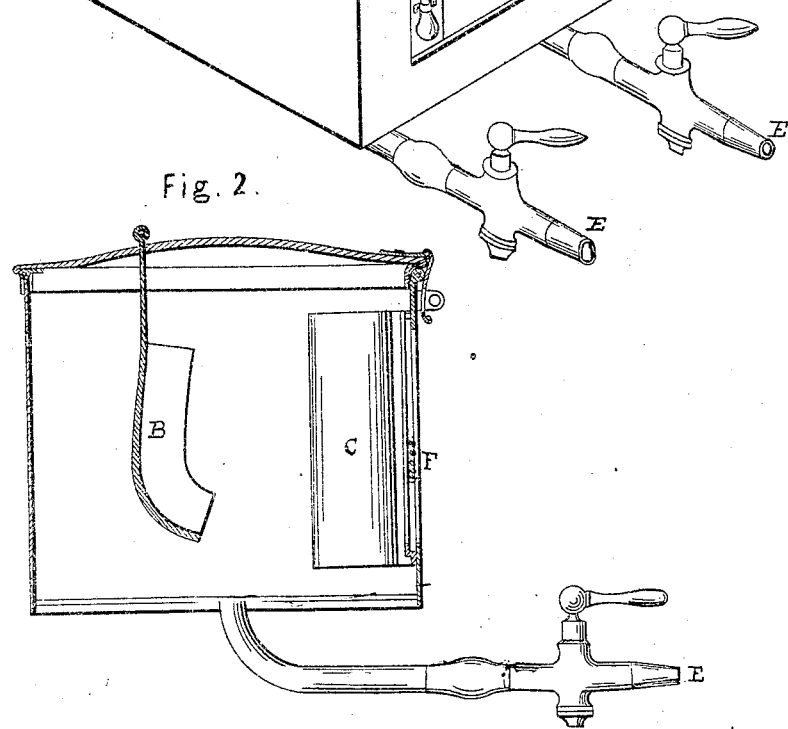

Figure 1 represents the perspective view; Fig. 2, the sectional view.

Letter A, the supply-pipe or end of worm as it enters the inclosed vessel; letter B, the washer, designed to keep the glass front free from vapor; letter C, the hydrometer to test the proof; letter D, the thermometer to give the temperature; letter E, the high and low wine faucets, one of which is to be connected with the high-wine pipe, the other to the low-wine pipe, which pipes enter into their respective tanks; letter F, the glass front, giving a view at all times of the hydrometer, thermometer, and liquor inclosed in the described vessel.

What I claim as my invention, and desire to secure by Letters Patent, is—

The connecting of an inclosed vessel (having one or more transparent sides) to the worm of the still into which the liquor passes, and where its proof is tested by an inclosed hydrometer and thermometer, and from thence passing into the high or low wine tank, as the case may be, so that no one can have access to the liquor from its passage from the worm to its respective tank.

W. J. WALKER.

Witnesses:
JOHN S. HOLLINGSHEAD,
JOHN D. BLOOR.